July 1, 1930. E. J. RUSSELL ET AL 1,769,191
CHOKER CONTROL
Filed March 13, 1929     2 Sheets-Sheet 2
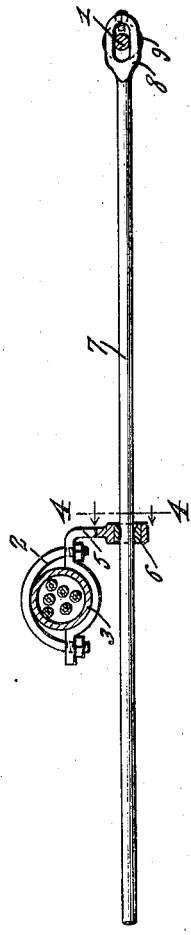
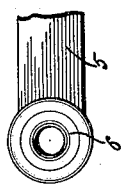
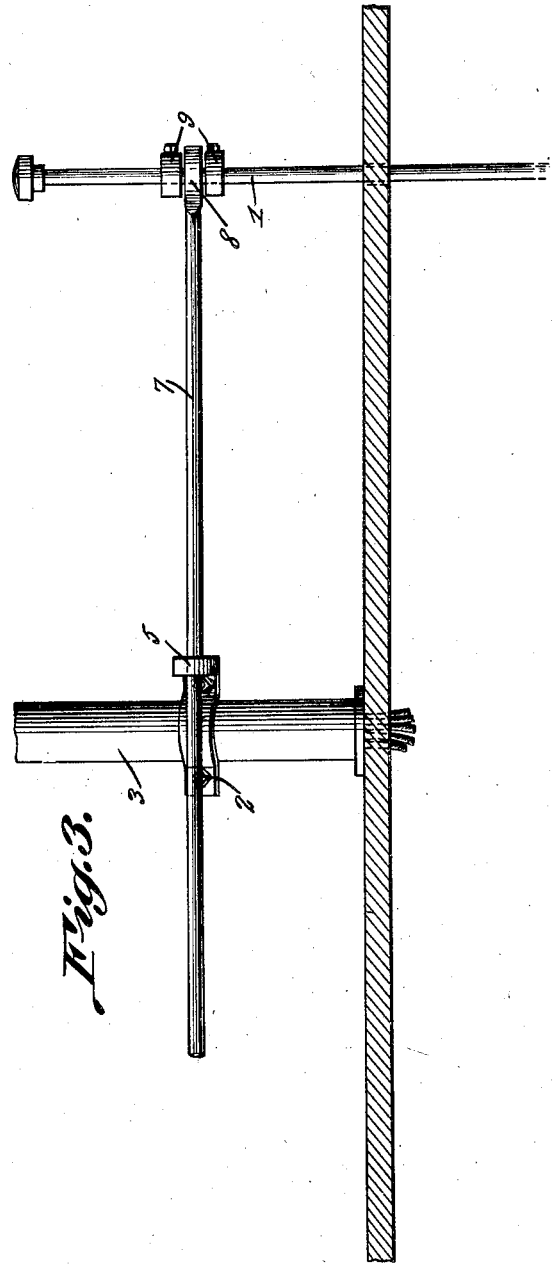
E. J. Russell
E. W. Goedeke, INVENTORS
BY Victor J. Evans
ATTORNEY Patented July 1, 1930

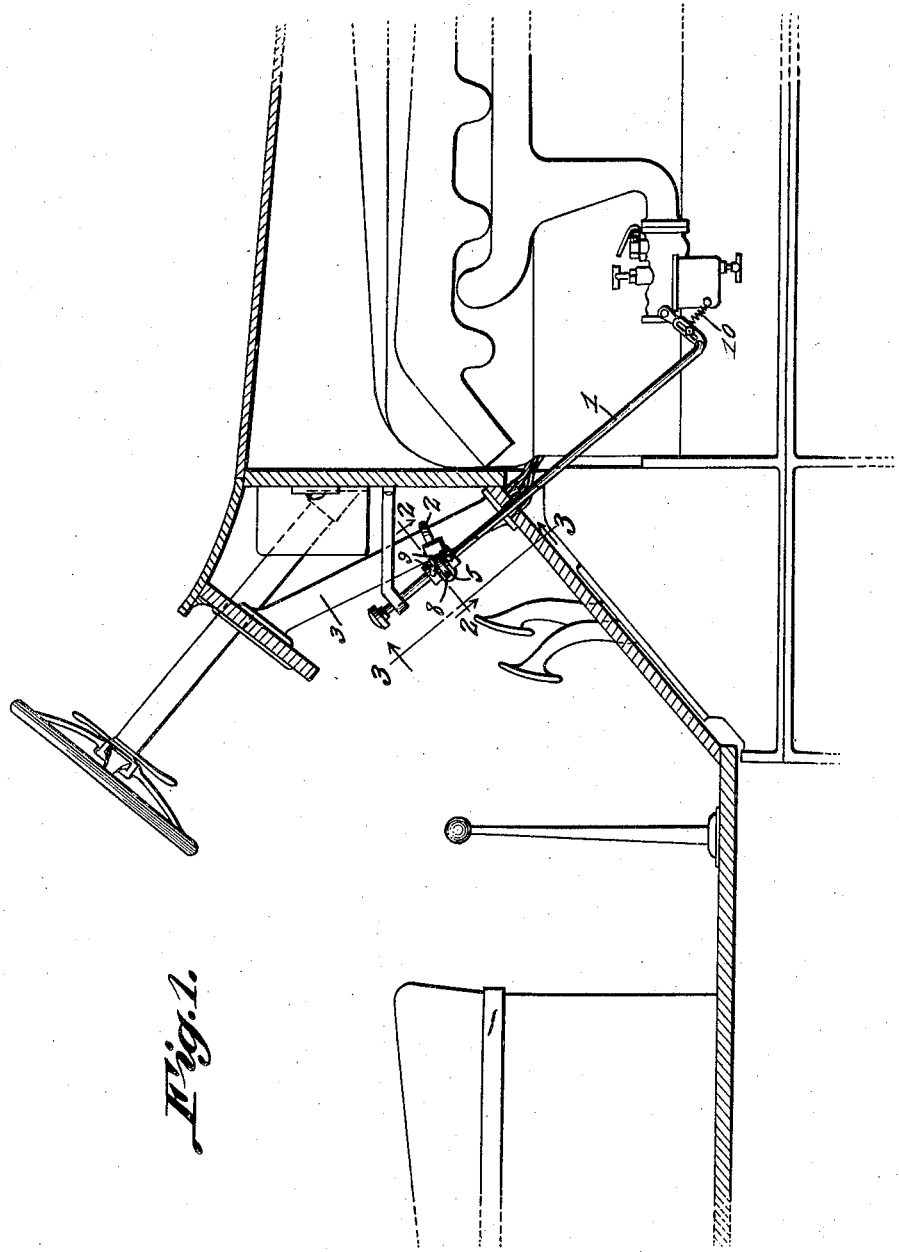

1,769,191

UNITED STATES PATENT OFFICE

EDGAR J. RUSSELL AND EDWARD W. GOEDEKE, OF ST. LOUIS, MISSOURI

CHOKER CONTROL

Application filed March 13, 1929. Serial No. 346,705.

This invention relates to a choker or primer control for motor vehicles which have the choker rod located to the right of the driver's seat, which renders it difficult for the driver to reach the rod, the general object of the invention being to provide a foot actuated lever which is pivotally connected to a part of the vehicle and is so connected to the choker rod that when the driver presses upon the lever with his foot, the rod will be actuated to close the choker valve, the spring on the choker arrangement acting to turn the parts to normal position when the foot is removed.

The invention is mainly designed for the new Ford type of motor vehicle.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a sectional view through part of an automobile, showing the invention in use.

Figure 2 is a section on line 2—2 of Figure 1.

Figure 3 is a section on line 3—3 of Figure 1.

Figure 4 is a section on line 4—4 of Figure 2.

In these views, the numeral 1 indicates the choker rod of the vehicle which, as before stated, is located on the right hand side of the vehicle so that it is extremely difficult for the driver to reach the rod and in doing so, he is likely to interfere with the passenger on the front seat.

In carrying out our invention, we place a clamp 2 on the tube 3 which contains some of the wiring of the electrical system of the vehicle, this clamp being formed with a rearwardly extending arm 5, the outer end of which is provided with an eye 6. A horizontally arranged rod or lever 7 passes through the eye and is formed with a flattened slotted end 8, the slot in which receives the choker rod and a pair of collars 9 is placed on the choker rod, one at each side of the flattened end of the lever so that movement of the lever will be communicated to the rod and movement of the rod to the lever. The lever extends to a point where it can readily be manipulated by the foot of the driver and as will be seen, when the free end of the lever is depressed by the foot, the other end of the lever, acting against one of the collars 9, will lift the choker rod so that the choker valve will be closed. As soon as the foot is removed, the spring 10 of the choker system will return the parts to normal position and thus open the valve.

Thus it will be seen that we have provided simple means for enabling the driver of a vehicle to close the choker valve by his foot and without bending over to reach the choker rod, which not only seriously interferes with the driving of the vehicle, but also bothers the passenger on the front seat. Of course, the choker rod can be manipulated by hand in the usual manner if the driver desires, as the attachment will not prevent this action.

It is thought from the foregoing description that the advantages and novel features of the invention will be readily apparent.

It is to be understood that changes may be made in the construction and in the combination and arrangement of the several parts, provided that such changes fall within the scope of the appended claim.

What we claim is:—

In a motor vehicle and in combination with the choker rod thereof, a clamp fastened to a part of the vehicle in rear of the dash, an arm on the clamp having an eye therein, a horizontally arranged lever passing through the eye and having a slot in one end through which the choker rod passes, a pair of collars on the choker rod, one on each side of the end of the lever, the other end of the lever being so located that it can be depressed by the foot of the driver whereby the choker valve will be closed.

In testimony whereof we affix our signatures.

EDGAR J. RUSSELL.
EDWARD W. GOEDEKE.